May 7, 1957  W. L. PALMER, JR  2,791,200
MOBILE HOPPER POULTRY FEEDER
Filed Oct. 2, 1953  2 Sheets-Sheet 1
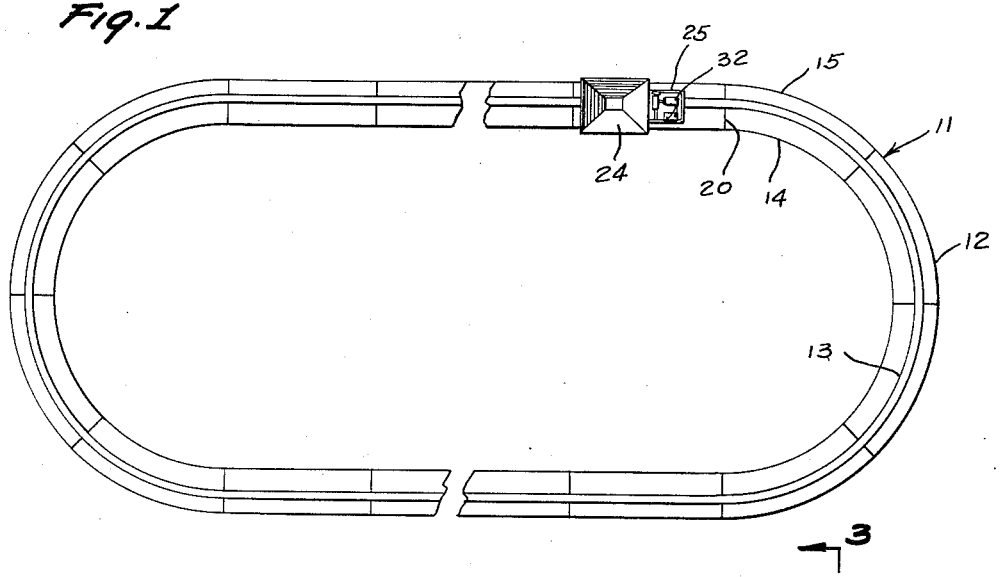
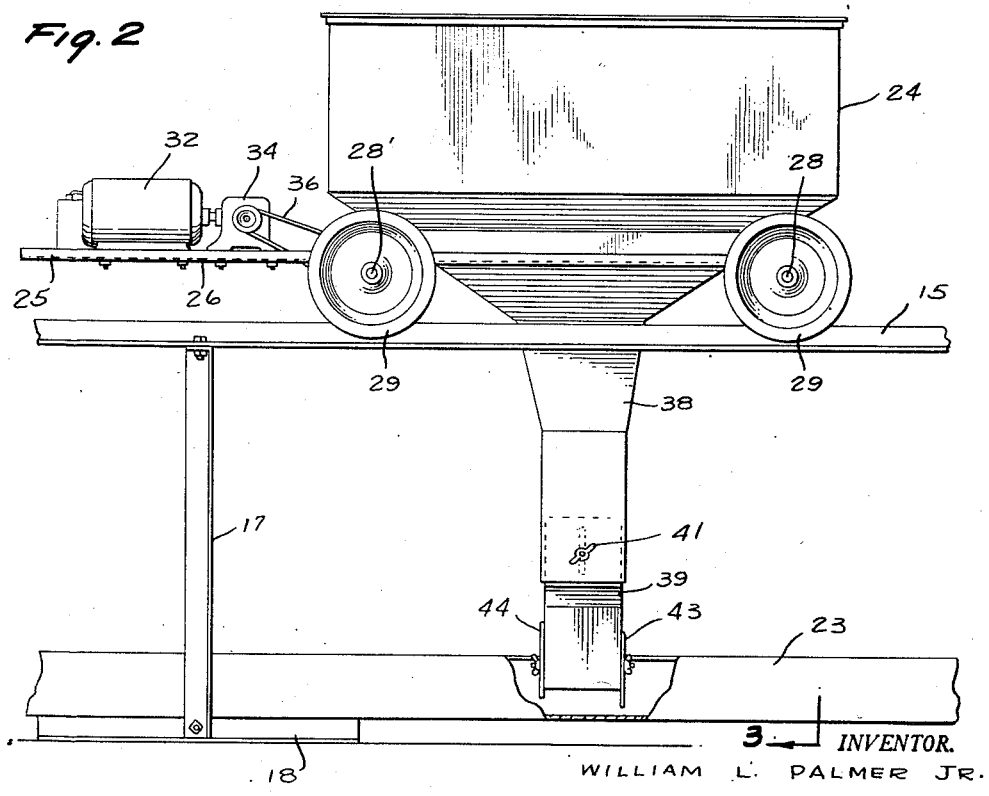
INVENTOR.
WILLIAM L. PALMER JR.
BY
McMorrow, Berman & Davidson
ATTORNEYS May 7, 1957 W. L. PALMER, JR 2,791,200
MOBILE HOPPER POULTRY FEEDER
Filed Oct. 2, 1953 2 Sheets-Sheet 2
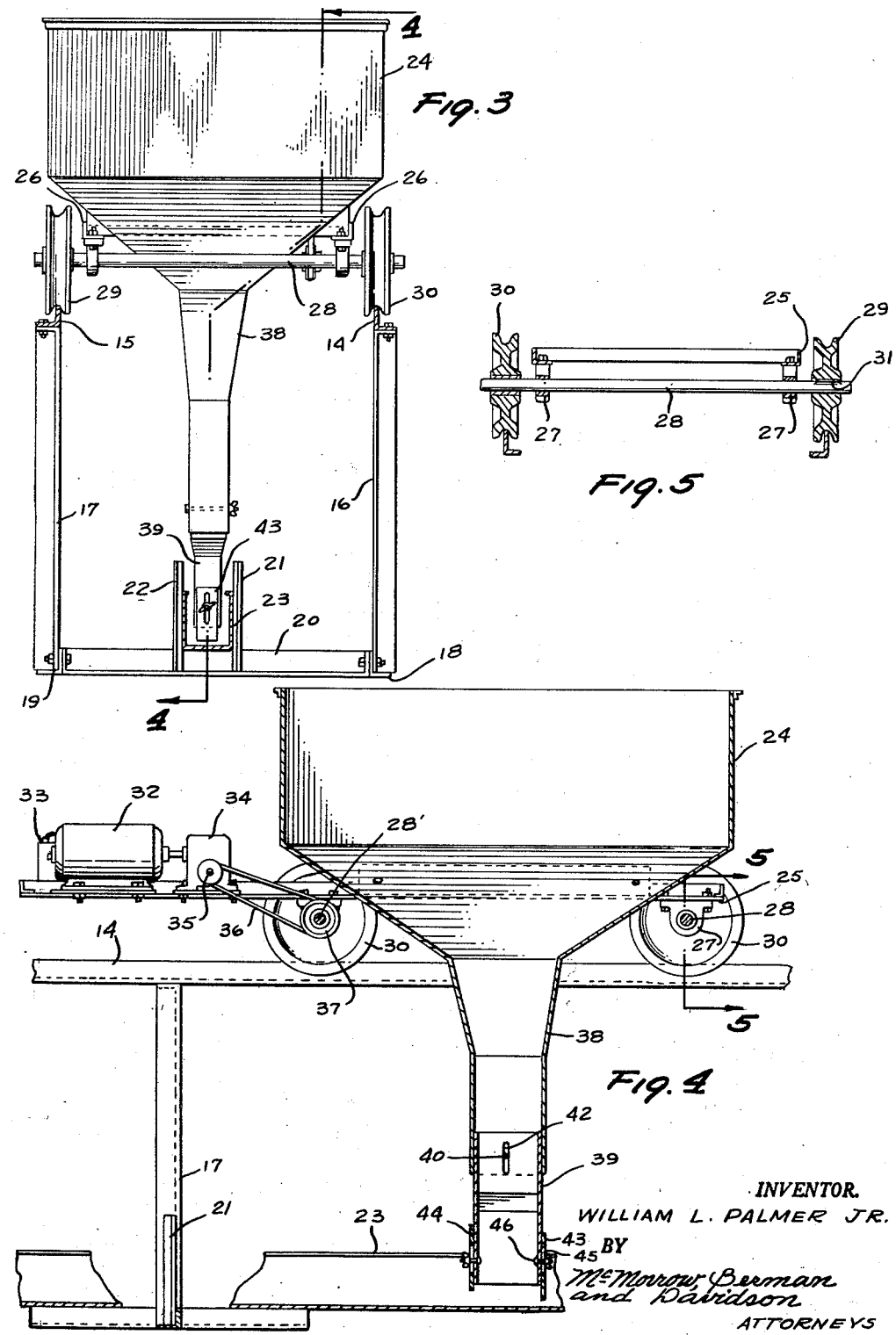
INVENTOR.
WILLIAM L. PALMER JR.
BY McMorrow, Berman
and Davidson
ATTORNEYS

United States Patent Office 2,791,200
Patented May 7, 1957

2,791,200

MOBILE HOPPER POULTRY FEEDER

William L. Palmer, Jr., San Angelo, Tex.

Application October 2, 1953, Serial No. 383,785

4 Claims. (Cl. 119—52)

This invention relates to improvements in poultry feeding devices, and more particularly to a device of this kind on which poultry feed is distributed in a continuous manner into an endless trough.

The main object of the invention is to provide a novel and improved poultry feeding apparatus wherein a movable hopper distributes feed in a continuous trough, thus eliminating the difficulties which would be encountered in the use of a feeder system having a stationary hopper, the improved apparatus being simple in construction, being easy to install, and requiring a minimum amount of maintenance.

A further object of the invention is to provide an improved poultry feeding apparatus which is electrically operated and wherein feed is distributed into a stationary feed trough from a moving hopper, the discharge portion of the hopper being adjustable to locate the lower end of the discharge member at any desired distance above the bottom of the trough, whereby to allow a desired depth of feed to be distributed, the apparatus involving inexpensive components, being durable in construction and being reliable in operation.

A still further object of the invention is to provide an improved poultry feeding apparatus wherein feed is distributed into a feed trough from a moving hopper, said apparatus being primarily intended for feeding prepared poultry feed, which is of uniform coarseness and weight and which flows by gravity without requiring agitation, but which is also capable of feeding whole grains containing small amounts of foreign matter.

A still further object of the invention is to provide an improved poultry feeding apparatus of the moving hopper type, wherein the outlet from the hopper to the feed trough is graduated downwardly in cross-sectional area, means being provided to control the flow of feed in accordance with the coarseness of the feed and other factors, the lower end of the outlet chute being adjustable relative to the feed trough to allow a desired depth of feed to be distributed.

Further objects and advantages of the invention will become apparent from the following description and claims, and from the accompanying drawings, wherein:

Figure 1 is a top plan view of an improved poultry feeding apparatus constructed in accordance with the present invention.

Figure 2 is an enlarged side elevational view showing the wheeled frame carrying the hopper, as employed in the apparatus shown in Figure 1, and showing the discharge spout of the hopper depending into the feed trough, a portion of the wall of said feed trough being broken away to facilitate the illustration of the bottom end of the discharge spout.

Figure 3 is a transverse vertical cross sectional view taken on the line 3—3 of Figure 2.

Figure 4 is a vertical cross sectional view taken on the line 4—4 of Figure 3.

Figure 5 is a cross sectional detail view taken on the line 5—5 of Figure 4.

Referring to the drawings, the improved poultry feeding apparatus is designated generally at 11. Said apparatus comprises a continuous track structure 12 on which is supported the continuous feed trough 13. The track structure 12 comprises a pair of angle bars 14, 15 which are supported in parallel elevated positions by vertical support bars 16, 17, whose lower ends are connected to respective bottom angle bars 18, 19, the angle bars 18, 19 extending parallel to the track bars 14, 15, and said angle bars 18, 19 being rigidly connected by transverse angle bars 20. Secured to the intermediate portions of the transverse bars 20 are the spaced, upstanding angle bars 21 and 22 between which the channel-shaped feed trough 23 is secured, thereby defining the rigidly united structure which includes the track bars 14 and 15 and the trough 23 extending parallel to and located below and midway between said track bars, as is clearly shown in Figure 3.

Designated at 24 is a feed trough which is rigidly secured on a horizontal frame 25, said horizontal frame including the longitudinal extending, parallel side bars 26, 26. The side bars 26, 26 are provided with the depending brackets 27, 27 in which are journalled the transversely extending axles 28, 28'. Mounted on each of said axles are the respective grooved wheels 29 and 30, the wheels 29 being rigidly keyed at 31 to the axles, whereas the wheels 30 are rotatable and slidable on said axles. Secured on the frame 25 adjacent the feed hopper 24 is the electric motor 32 which is energized by a battery 33 carried on said frame, the motor being provided with the gear reduction unit 34, and the output shaft 35 of said unit being coupled by a belt 36 to a pulley 37 secured on the axle 28', as shown in Figure 4. Thus, the motor 32 drives the axle 28', causing the hopper 24 to be moved continuously around the track structure as long as the motor 32 remains energized. The wheels 30 are movable inwardly and outwardly on their respective axles 28 and 28' in accordance with variations in distance between the tracks and to allow the frame 25 to pass smoothly around curves.

The hopper 24 is provided with the depending discharge spout 38, said spout being provided at its lower end with the telescopic discharge nozzle 39, said nozzle being adjustable vertically in the spout 38, and being provided on opposite sides thereof with the locking bolts 40 having the wing nuts 41 for clamping the nozzle 39 in adjusted position.

As shown in Figure 4, the nozzle 39 provided with the slots 42 through which the bolts 40 extend, for allowing vertical adjustment of the nozzle 39.

The bottom end of the nozzle 39 is provided on its forward and rear portions with the respective depending flaps 43 and 44, the nozzle 39 extending downwardly into the trough 23, as shown in Figures 2, 3 and 4, and the forward flap 43 being adjustably connected to the forward transverse wall of the nozzle 39, while the flap 44 is adjustably connected to the rear transverse wall of said nozzle. The flaps 43 and 44 are provided with vertical slots 45 through which extend clamping bolts 46, said clamping bolts being provided with wing nuts, whereby the flaps may be locked in vertically adjusted positions relative to the bottom end of the discharge nozzle 39. As shown in Figure 4, the forward flap 43 is secured in a lower position than the rear flap 44, the forward flap 43 being set so that its bottom edge is at approximately the level of the feed already in the trough 23, the rear flap 44 being set at a position wherein its bottom edge is at a height in accordance with the amount of feed to be distributed to the trough.

In operation, feed flows downwardly from the hopper 24 through the spout 38 and the nozzle 39 by gravity into the trough 23, the flow of the feed being aided by the vibration of the hopper as it moves along the track bars 14 and 15. Obviously, if so desired, a suitable agitator may be provided in the lower portion of the feed hopper 24 to assist the descent of the feed therefrom.

It will be further apparent that the frame 25 may be propelled by hand instead of employing the electric motor 32 and battery 33, and that, if so desired, the motor 32 may be energized from an external line instead of from the battery 33 by providing suitable flexible line cords for connecting the motor to a power line.

Obviously, the vertical supporting member 17 may be of any desired height to support the tracks 14 and 15 at a desired elevation above the feed trough 23. If so desired, adjustable post members of a telescopic type, or other suitable adjustable type may be employed in place of the supporting post members 17 to facilitate the vertical adjustment of the tracks 14 and 15 relative to the feed trough 23.

If so desired, the feed trough 23 may be made vertically adjustable with respect to the upstanding vertical bars 21 and 22, whereby the elevation of the feed trough 23 relative to the transverse supporting bars 20 may be achieved if so desired, suitable means being provided for securing the feed trough 23 to the vertical guide bars 21 and 22 in the adjusted position of said feed trough.

The dimensions of materials and parts, as well as the size of the different elements, of the apparatus above described may be varied substantially to meet the conditions existing in any locality or with any particular poultry raiser, to allow the invention to be used to feed fowls of any size or number. All of the different parts of the invention can be welded or bolted together.

While a specific embodiment of an improved poultry feeding apparatus has been disclosed in the foregoing description, it will be understood that various modifications within the spirit of the invention may occur to those skilled in the art. Therefore, it is intended that no limitations be placed on the invention, except as defined by the scope of the appended claims.

What is claimed is:

1. In a feed distributing device, a trough, track means supported above and along the trough, a hopper rollably supported on the track means, a depending spout on said hopper having a lower end, a discharge nozzle on said lower end, said nozzle having a lower end in the trough, said nozzle having opposite sides facing the length of the trough, and vertically adjustable vertical plates on said opposite sides, said plates having lower edges disposed below the lower end of the nozzle for limiting the depth of and distributing feed as the feed is discharged by the nozzle into the trough, one of said plates being arranged to be elevated to dispose its lower edge below the lower edge of the other plate in accordance with the direction of travel of the hopper along the trough.

2. A feed distributing device comprising an elongated frame having longitudinally spaced vertical side bars on opposite sides thereof having upper and lower ends, some of the vertical bars being transversely aligned with each other across the frame, transverse bars extending between and secured to the lower ends of transversely aligned side bars, tracks mounted on the upper ends of vertical side bars at opposite sides of and extending longitudinally of the frame, an elongated trough mounted on said transverse bars and extending longitudinally of the frame below the tracks and spaced from the vertical bars at the opposite sides of the frame, a hopper assembly having longitudinally spaced wheels on opposite sides thereof running on the tracks at opposite sides of the frame, said assembly comprising a hopper mounted disposed above and between the tracks, a depending spout on said hopper having a lower end, and a discharge nozzle on and depending from the lower end of the spout, said nozzle having a lower end disposed in the trough.

3. A feed distributing device according to claim 2 wherein said hopper assembly further comprises a horizontal open hopper frame having spaced side members and opposed ends, said hopper being mounted on and between the hopper frame side members and between the opposed ends of the hopper frame.

4. A feed distributing device according to claim 2 wherein said hopper assembly further comprises a horizontal open hopper frame having spaced side members and opposed ends, said hopper being mounted on and between the hopper frame side members and between the opposed ends of the hopper frame, said hopper frame further comprising axles journaled on said side members on which said wheels are mounted, and a motor mounted on one end of the hopper frame and operatively connected to some of the wheels.

References Cited in the file of this patent

UNITED STATES PATENTS

| 739,962 | Werner | Sept. 29, 1903 |
| 1,138,950 | Henderson | May 11, 1915 |
| 2,314,344 | Cornell | Mar. 23, 1943 |
| 2,522,449 | Inman | Sept. 12, 1950 |
| 2,536,621 | Arnold | Jan. 2, 1951 |
| 2,591,609 | Roberts et al. | Apr. 1, 1952 |
| 2,601,057 | Roberts et al. | June 17, 1952 |
| 2,659,346 | Paparazzo et al. | Nov. 17, 1953 |

FOREIGN PATENTS

| 15,044 | Great Britain | Apr. 4, 1896 |